E. Hamilton,
Snap Hook.

Nº 48,275.        Patented June 20, 1865.

Witnesses.
L. L. Bond,
C. C. Pomeroy.

Inventor,
Edward Hamilton

UNITED STATES PATENT OFFICE.

EDWD. HAMILTON, OF CHICAGO, ILLINOIS.

IMPROVED SNAP-HOOK.

Specification forming part of Letters Patent No. 48,275, dated June 20, 1865.

*To all whom it may concern:*

Be it known that I, EDWARD HAMILTON, of the city of Chicago, in the county of Cook and State of Illinois, have invented certain new and useful Improvements in Snap-Hooks; and I do hereby declare that the following is a full, clear, and exact description of the same, reference being had to the accompanying drawings, in which—

Figure 5:
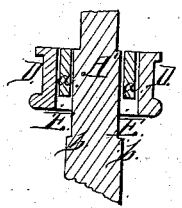
Figure 1:
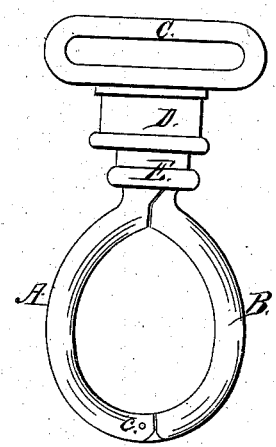
Figure 4:
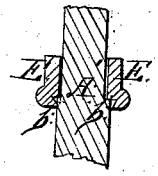
Figure 6:
Figure 2:
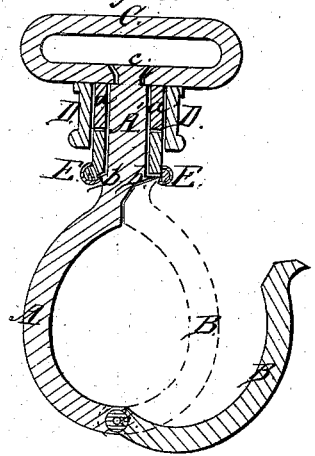
Figure 3:
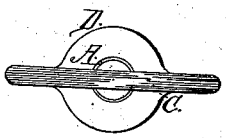

Figure 1 is a view of a complete hook; Fig. 2, a longitudinal section; Fig. 3, an end view; Fig. 4, a longitudinal section of collar; Fig. 5, a longitudinal section of cylinder, spring, and shank; and Fig. 6, a transverse section of spring and shank.

Like letters refer to similar parts in all of the figures.

The nature of my invention consists in providing the main part of the swivel, or that part which is permanently attached to the strap, with a barrel or cylinder, which is made to receive the shank of the hook through its center, and between such shank and its inner circumference a spring and a movable collar; in providing the shank of the hook proper with a sliding or movable collar, which at its inner extremity rests upon a spring and has its outer end chambered, so as to rest against a shoulder on the shank of the hook; in providing the shank of the hook with a shoulder or stop to prevent the collar from catching or slipping out of the cylinder, and in the several combinations hereinafter set forth and claimed.

To enable others skilled in the art to make and use my invention, I will proceed to describe its construction and operation.

I make my snap-hooks about in the form shown at Fig. 1. The size of the hooks and of their several parts varies according to the use to which they are to be put. They are made of brass, malleable cast-iron, or other suitable material, and the parts are made of sufficient strength to perform the service required. In the form shown the complete hook is about four and one-half inches in length and about two and one-fourth inches broad at the two widest points.

To the eye or staple C, I attach a cylinder, D, which is about three-fourths of an inch in length, and is provided with a cylindrical cavity of about three-fourths of an inch in diameter. Through the center of this cavity I put the shank A' of the hook, which shank is provided with a shoulder, or has its diameter reduced, so as to present a shoulder at the bottom of the cylindrical cavity, resting against the bottom of the cylinder or against the eye C. The reduced portion passes through the metal of the eye, and is headed or riveted on the inside of the eye, as shown at e.

The space between the shank A' and the cylinder D is filled with a rubber or metallic spring, a, which is about one-half inch in length, and, when made of rubber, is usually made by cuttings from rubber pipe fitted to the desired size of the hook. If made of metal, it will be made of coiled wire. It is designed to have the spring fill about two-thirds of the length of the cylinder D.

I provide the shank A' with a collar, E, which rests against the spring a in the cylinder, and is fitted to the shank and also to the cylinder D. The outer end of the collar is chambered, as shown at b, Figs. 2 and 4, which chamber is fitted so as to rest against the shoulder or stop b, and also to receive the end of the movable part of the hook B. This arrangement also keeps the collar in place and prevents its coming so far out as to stick against the enlarged parts of the hook and from getting out of the cylinder.

The hook A is made oval, or of any other desired form, and is provided with a hinged arm, B. The hinge-joint may be in the middle, as shown, or at one side of the center, and when any heavy service is required it would, perhaps, be better at one side than in the center.

It will be observed that the hook is a swivel-hook; but if a swivel is not desired a closer riveting at e will prevent its turning; but for halters, ropes, &c., a swivel-joint is better.

To operate the hook, press the collar E down on the spring, when the hook will open. It is closed by simply pressing the arm B against the collar, thus making a complete snap-hook, which will be found useful for a variety of purposes outside of harness uses, and its size will be increased or diminished about in the proportions hereinbefore set forth.

Having thus fully described my invention, what I claim as new, and desire to secure by Letters Patent, is—

1. The cylinder D, when attached to the eye or swivel of a snap-hook and fitted to receive a shank, collar, or slide and spring.

2. The shoulder or stop *b*, in combination with the collar E.

3. The collar E, when applied to a snap-hook and has its inner end rest on a spring and its outer end arrested by a stop.

4. The combination of the collar E, spring *a*, and stop *b* with the hook A.

5. The combination of the cylinder D, collar E, spring *a*, and stop *b* with the hook A, arm B, and eye C.

6. The combination and arrangement of the collar E, spring *a*, and the incline of the end of the arm B, whereby I am enabled to close the hook by simple pressure on the arm B, each of said parts and combinations being constructed and arranged substantially as and for the purposes set forth and specified.

EDWARD HAMILTON.

Witnesses:
L. L. BOND,
C. C. POMEROY.